United States Patent

Grosch

Patent Number: 5,161,127
Date of Patent: Nov. 3, 1992

[54] METHOD OF DETERMINING THE TARGET DIRECTION AND TARGET RANGE OF SOUND GENERATING TARGETS

[75] Inventor: Hermann Grosch, Wülfrath, Fed. Rep. of Germany

[73] Assignee: Rheinmetall GmbH, Düsseldorf, Fed. Rep. of Germany

[21] Appl. No.: 634,180

[22] PCT Filed: Nov. 2, 1989

[86] PCT No.: PCT/EP90/00894
§ 371 Date: Jan. 3, 1991
§ 102(e) Date: Jan. 3, 1991

[87] PCT Pub. No.: WO91/06874
PCT Pub. Date: May 16, 1991

[30] Foreign Application Priority Data
Nov. 2, 1989 [DE] Fed. Rep. of Germany ....... 3936359

[51] Int. Cl.$^5$ .................. G01S 3/80; G01S 11/00; G01V 1/00
[52] U.S. Cl. ...................... 367/124; 367/136
[58] Field of Search ............... 367/124, 135, 136, 906; 340/541, 522

[56] References Cited

U.S. PATENT DOCUMENTS 3,995,223  11/1976  Gimber et al. .............. 367/93
4,811,308  5/1989  Michel ........................ 367/136

FOREIGN PATENT DOCUMENTS 3140728  2/1985  Fed. Rep. of Germany .
3705981  9/1988  Fed. Rep. of Germany .
3601053  11/1988  Fed. Rep. of Germany .
3804495  6/1989  Fed. Rep. of Germany .
2114744  8/1983  United Kingdom .

Primary Examiner—Daniel T. Pihulic
Attorney, Agent, or Firm—Spencer, Frank & Schneider

[57] ABSTRACT

A method is disclosed in which the direction and range of sound generating targets (2) is determined solely by means of passive sensors (10, 11). In this connection it is proposed to employ a seismic sensor (10) in addition to the acoustic sensors (11) customarily required for a bearing angle determination. In this case, a line characteristic of the signal source of the target (2) is measured in the airborne sound spectrum as well as in the solid-borne sound spectrum and the radial target velocity ($V_{z,r}$) is determined from the Doppler shift of these lines and the propagation velocity (C) of the corresponding waves and, under consideration of the bearing angle ($\alpha$), the target range (r) is calculated therefrom.

4 Claims, 1 Drawing Sheet

METHOD OF DETERMINING THE TARGET DIRECTION AND TARGET RANGE OF SOUND GENERATING TARGETS

BACKGROUND OF THE INVENTION

The invention relates to a method of determining the target direction and target range of sound generating targets, such wheeled or track-laying vehicles, with the aid of a sensing arrangement composed of a plurality of sensors including acoustic sensors to determine the target direction, i.e. the target bearing angle.

For the full realization of area defense mines, sensors are required which reconnoiter potential targets (wheeled and track-laying vehicles) with sufficient accuracy so that the ammunition can be used effectively. As a function of the deployment system (throwing system, etc.) and the ammunition (e.g., conventional ammunition, target sensing ammunition) target range and direction must be determined. Typical distance ranges are—depending on the design of the ammunition—40 to 300 m.

German Patent No. 3,140,728 discloses, for example, a method of determining the target direction and target range in which the target is detected by means of an airborne sound sensor composed of four microphones. The range is determined with the aid of an active target sensor composed of a sound source and the mentioned airborne sound sensor. The primary drawback of this arrangement is that the target detection device itself must include a sound source. Moreover, such active sensors are easy to detect.

German Patent No. 3,601,053 discloses an actuator arrangement for a rigid directional mine including a laser range finder. In this case as well, an active sensor is involved which is easy to detect.

DE-OS German Offenlegungsschrift (printed unexamined application) 3,705,981 discloses a device for detecting a target and initiating ignition that includes a seismic sensor and an acoustic sensor composed of two directional microphones and in this case, the seismic sensor serves to activate the directional microphones, and thus constitutes a so-called prompting sensor. The bearing angle is then determined with the aid of the directional microphones. The target range is not measured by this prior art device.

Finally, DE-OS German Offenlegungsschrift (printed unexamined application) 3,804,495 discloses an electronic ignition device for antitank mines which includes a seismic sensor and three magnetic field sensors. In this case again, the seismic sensor serves as a prompting sensor.

SUMMARY OF THE INVENTION

It is the object of the present invention to further develop the method described above so that a determination of the target direction and target range can be made solely by means of passive sensors.

This is accomplished according to the invention by a method of determining the target direction and target range of sound generating targets, such as wheeled or track-laying vehicles, with the aid of a sensor arrangement composed of a plurality of sensors with acoustic sensors for airborne sound being employed to determine the target direction (bearing angle determination), and wherein, to find the target range, in addition to the acoustic sensors, a seismic sensor is employed, a characteristic line in the airborne sound spectrum and a characteristic line in the solid-borne sound spectrum is measured for each signal source characteristic of the target, the radial target velocity ($V_{z,r}$) is calculated from the Doppler shift of these spectral lines and from the propagation velocity (C) of the corresponding waves, and the target range (r) is calculated from the radial target velocity and the bearing angle ($\alpha$).

Particularly advantageous features of the method are disclosed in the dependent claims.

The method according to the invention thus utilizes the effect that drive assemblies and track-laying noises of wheeled and track-laying vehicles actuate the airborne sound and solid-borne earth or sound borne sound channels in the same manner. The bearing angle $\alpha$ relative to the target is preferably obtained from the airborne sound channel by way of a correlation method. For this purpose, at least three microphones should be arranged preferably in the form of an equilateral triangle.

For a determination of the target range, Fourier transforms are employed to transform the acoustic and seismic signals into the frequency domain. In both line spectra, one line is identified in the airborne sound spectrum and one in the solid-borne or earth borne; and sound spectrum, both originating from the same signal source of the vehicle (e.g. the fundamental line of the engine). With knowledge of the bearing angle $\alpha$ and the propagation velocity $C_R$ of the Rayleigh wave of the solid-borne sound which is automatically determined during the process, the radial target velocity $V_{z,r}$ can then be determined by way of an evaluation of the Doppler effect in the airborne and solid-borne sound channels. From the radial target velocity it is then possible to calculate the target range r by way of the bearing angle $\alpha$.

The method disclosed here determines bearing and target range exclusively by the evaluation of airborne and solid-borne sound signals, that is only by means of passive sensors.

Further advantages and details of the invention will now be described with reference to an embodiment thereof and with the aid of drawing figures.

BRIEF DESCRIPTION OF THE DRAWINGS

It is shown in.

DESCRIPTION OF THE PREFERRED EMBODIMENTS

Figure 1:
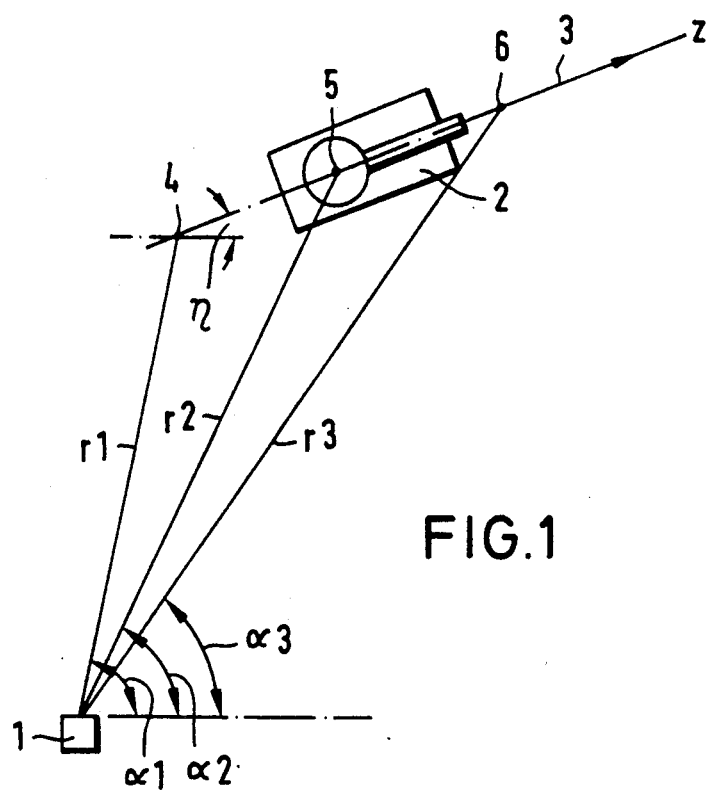
FIG. 1 is a schematic illustration of a tank moving relative to a sensor arrangement.

In FIG. 1, a sensor arrangement 1 is a target 2 such as a tank whose distance is to be determined and which moves on a straight line 3. Target 2 moves successively from a point 4 via point 5 to point 6. The respective bearing angles are marked $\alpha 1$, $\alpha 2$ and $\alpha 3$, while the direction of the target movement is marked $\eta$. The corresponding target distances of sensor arrangement 1 from target points 4, 5 and 6 are marked r1, r2 and r3.

Figure 2:
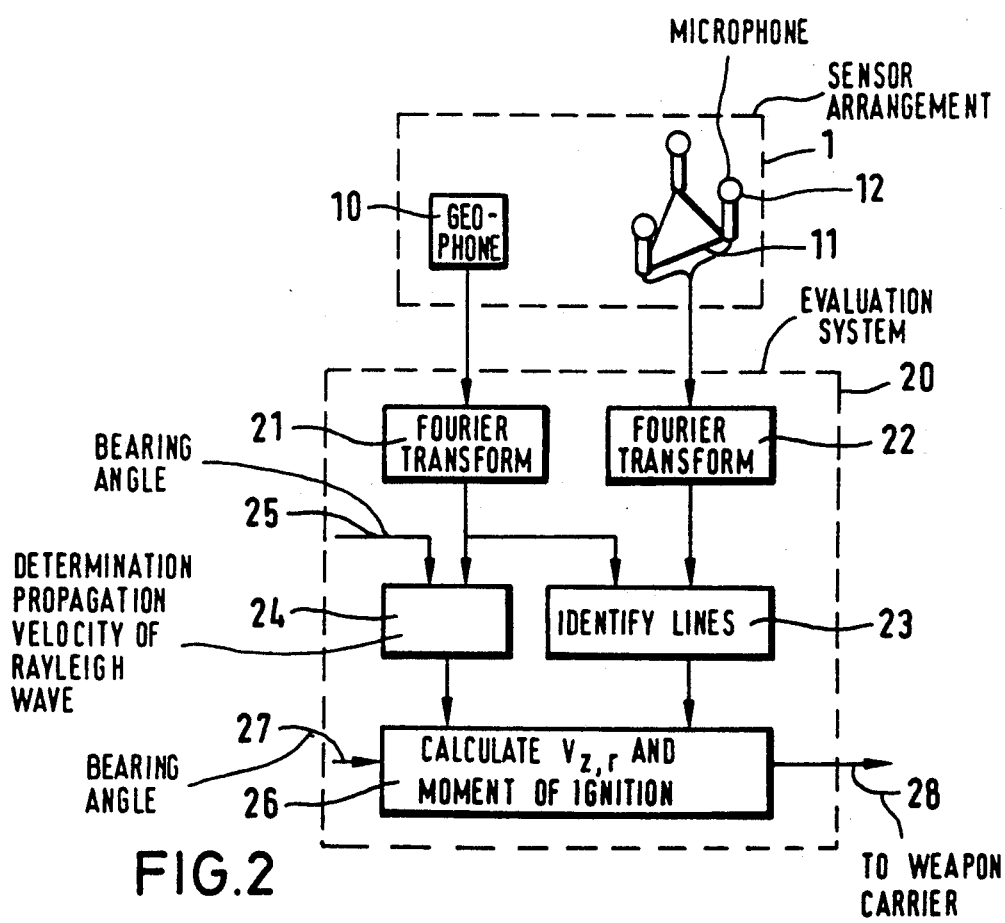
FIG. 2 is a block circuit diagram of a sensor arrangement including an electronic evaluation device for carrying out the method according to the invention.

FIG. 2 once more shows sensor arrangement 1 and an electronic evaluation system 20 associated with the sensor arrangement 1 to generate the corresponding ignition signals.

Sensor arrangement 1 includes a seismic sensor 10 (geophone) as well as an airborne sound sensor 11 which is essentially composed of three microphones that are preferably arranged in an equilateral triangle and from whose output signals the bearing angle $\alpha$ is determined in a known manner (not shown).

To determine the target range with the aid of function units 21 and 22, electronic evaluation system 20 performs a Fourier transformation of the corresponding signals coming from the sensors 10 and 11 of the sensor arrangement 1. Then, spectral lines are identified in function unit 23 to ensure that only frequencies <100 Hz are analyzed with respect to their Doppler shifts. They must be lines that are characteristic signal sources from the target 2. In particular, the fundamental line of the engine or the sound of the track-laying chains are appropriate signal sources from the target. This means that associated lines in the airborne and solid-borne (earth-borne) sound channels can be identified in a simple manner.

Significant advantages result in that two associated lines of approximately the same frequency can be identified in the solid-borne and airborne sound channels because the following then applies:

$$\frac{f_D \text{ (air)}}{f_D \text{ (solid)}} \approx 1$$

The lines are identified in function unit 23 in such a manner that the spectrum of the solid-borne sound signal is examined for a line which, with respect to the line having the highest spectral power in the airborne sound channel, has a frequency position shifted by a value of $<|10 \ldots 15 \text{ Hz}|$ relative to the line in the airborne sound channel. If such a line cannot be identified, the process is repeated with the line of the next highest spectral power.

With the aid of function unit 24, the propagation velocity $C_R$ of the Rayleigh wave or surface wave measured by geophone 10 is determined, with the corresponding bearing angle value $\alpha$ being fed in via line 25. The determination of $C_R$ will be described in greater detail below. In function unit 26, the target range is then calculated from the Doppler frequency shifts of the propagation velocity of the Rayleigh wave, the speed of sound and the bearing angle. The target range and the bearing angle then furnish the corresponding criteria for the moment of ignition so that appropriate ignition signals can be transmitted via line 28 to the weapon carrier (not shown).

Of course the above-mentioned function units 21, 22, 23 and 24 need not be hardware components. Rather, these units may also be realized by means of an appropriately programmed computer.

The calculation of the target range on the basis of the measured Doppler frequency shifts and bearing angles $\alpha$ will now be described in somewhat greater detail.

If target 2 (FIG. 1) moves relative to sensor arrangement 1 at a velocity $V_{z,r}$ (movement of target 2 at distance r in direction z), the Doppler effect shifts the target characteristic lines as follows:

For the Rayleigh wave:

$$f_{DR} = f_R \left( 1 + \frac{V_{z,r}}{C_R(f_R) - V_{z,r}} \right) \tag{1}$$

where $f_{DR}$ is the Doppler frequency $f_R$ is the frequency without Doppler shift $C_R$ is the propagation velocity of the Rayleigh wave.

For the sound wave:

$$f_{DS} = f_S \left( 1 + \frac{V_{z,r}}{C_S(f_S) - V_{z,r}} \right) \tag{2}$$

where $F_{DS}$ is the Doppler frequency $f_S$ is the frequency of the sound wave without Doppler shift $C_S$ is the speed of sound.

The velocity results as follows from (1) and (2):

$$V_{z,r} = \frac{C_S(f_S) \left( \frac{f_{DS}}{f_{DR}} - 1 \right)}{\frac{f_{DS}}{f_{DR}} - \frac{C_S(f_S)}{C_R(f_R)}} \tag{3}$$

For a calculation of the velocity $V_{z,r}$ it is further necessary to determine the propagation velocity $C_R$ of the Rayleigh wave at the corresponding frequency. In principle, a determination of the propagation velocity $C_R$ of a Rayleigh wave is possible only by evaluating sufficiently broadbanded signals emitted by the vehicle. If a cross spectrum is formed between the signals of two sensors transformed into the frequency domain, the propagation velocity $C_R$ can be determined as follows by way of the phase angle $\Theta$ of the cross spectrum:

$$\Theta(k \cdot F_G) = \arctan \frac{Im[S_1^*(k \cdot F_G) \cdot S_2(k \cdot F_G)]}{Re[S_1^*(k \cdot F_G) \cdot S_2(k \cdot F_G)]}$$

and $$C_R(k \cdot F_G) = \frac{d \cdot k \cdot F_G \cdot 2\pi}{\Theta(k \cdot F_G)} \cdot \cos \alpha$$

where k = a running variable $F_G$ = the frequency resolution of a discrete frequency spectrum $S_i^*$ = the conjugated complex spectrum of a discrete signal S $S_2$ = a discrete signal in the frequency domain d = the space between two geophones With the aid of $C_R$, $\alpha$ and $V_{z,r}$, the target range r is calculated as follows:

$$r_1(0)e^{j\alpha_1} + |V_z| \cdot e^{j\eta} = r_2(T_i) \cdot e^{j\alpha_2},$$

$$r_2(T_i)e^{j\alpha_2} + |V_z| \cdot T_i \cdot e^{j\eta} = r_3(2T_i) \cdot e^{j\alpha_3},$$

$$V_{z,r}(r_2) = |V_z| \cdot \cos(\alpha_2 - \eta),$$

$$V_z(r_3) = |V_z| \cdot \cos(\alpha_3 - \eta),$$

$$(V_z \cdot T_i)^2 = r_1^2(0) + r_2^2(T_i) - 2r_1(0) \cdot r_2(T_i) \cdot \cos(\alpha_1 - \alpha_2),$$

where $T_i$ is the time required by the vehicle to travel from point 4 to point 5 and from point 5 to point 6, respectively (FIG. 1).

I claim:

1. A method of determining the target direction and target range of a sound generating target relative to a sensor arrangement comprised of passive sensors comprising:

providing the sensor arrangement with a plurality of acoustic sensors for sensing airborne sound generated by the target and for producing an output signal corresponding thereto;

determining the bearing angle ($\alpha$) of the target relative to the sensor arrangement from the output signals of the acoustic sensors;

providing the sensor arrangement with a seismic sensor for sensing ground-borne sound generated by the target and for producing an output signal corresponding thereto;

measuring a target characteristic spectral line in the airborne sound spectrum of the output signal of the acoustic sensors and a target characteristic spectral line in the ground-borne spectrum of the output signal of the seismic sensor for a signal source characteristic of the target to determine the Doppler shift of the respective signals;

calculating the radial target velocity ($v_{z,r}$) from the determined Doppler shifts of the measured spectrual lines and from the propagation velocity (C) of the corresponding sound waves; and calculating the target range (r) from the bearing angle ($\alpha$) and the radial target velocity.

2. A method according to claim 1 wherein only lines less than 100 Hz in the ground-borne sound spectrum are measured to determine the Doppler shift.

3. A method according to claim 1 wherein only lines of approximatelty the same frequency in the ground-borne sound spectrum and in the airborne sound spectrum are measured to determine the Doppler shift so that the following applies: $f_D(\text{air})/f_D(\text{solid}) \approx 1$, where $f_D(\text{air})$ is the frequency of the target characteristic line in the airborne spectrum and $f_D(\text{solid})$ is the frequency of the target characteristic line in the ground-borne spectrum.

4. A method according to claim 2, wherein only lines of approximately the same frequency in the ground-borne spectrum and in the airborne sound spectrum are measured to determine the Doppler shift so that the following applies: $f_D(\text{air})/f_D(\text{solid}) \approx 1$, where $f_D(\text{air})$ is the frequency of the target characteristic line in the airborne spectrum and $f_D(\text{solid})$ is the frequency of the target characteristic line in the ground-borne spectrum.

* * * * *